Oct. 17, 1939.  T. J. GORMAN, JR  2,176,711
MEANS FOR ATTACHING BAILS TO CANS
Filed Feb. 18, 1937
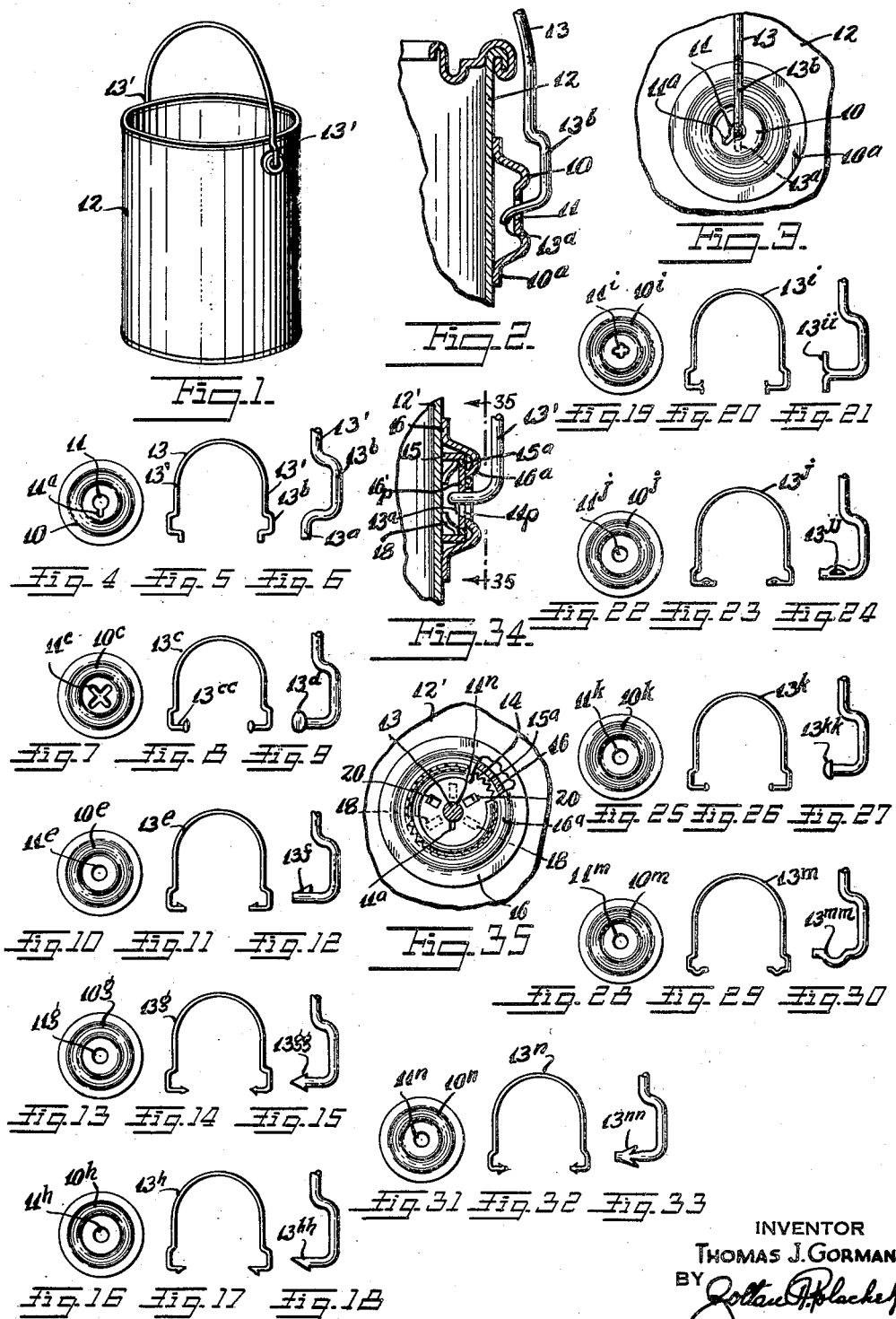
INVENTOR
THOMAS J. GORMAN, JR.
BY
ATTORNEY Patented Oct. 17, 1939

2,176,711

UNITED STATES PATENT OFFICE 2,176,711

MEANS FOR ATTACHING BAILS TO CANS

Thomas J. Gorman, Jr., Newark, N. J.

Application February 18, 1937, Serial No. 126,413

3 Claims. (Cl. 220—91)

This invention relates to new and useful improvements in a means for attaching bails to cans.

The invention has for an object to characterize the attaching means by a disc element which is formed with a key opening and which is associated with means by which it is mounted on the side of a can, and a bail arm with a key engageable into said key opening.

The invention contemplates to so construct the disc element that the key opening may be of various shapes and designs. It is then proposed to so construct the bail arm and its key to be operative with the specific key openings.

Another one of the objects of this invention resides in an arrangement which will permit the disc element to be rotatively fixed in various positions necessitating the bail to be placed in a pre-determined position when it is required to engage it in place and to remove it from its position.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a can with a bail attached according to an attaching means constructed according to this invention.

Fig. 2 is a fragmentary enlarged vertical transverse sectional view disclosing the attaching means and a portion of the bail arm.

Fig. 3 is an outside elevational view of Fig. 2.

Fig. 4 is an elevational view of the disc element used on the can illustrated in Figs. 1 to 3.

Fig. 5 is an elevational view of the bail used in the form of the invention shown in Fig. 4.

Fig. 6 is an enlarged detailed view of a portion of the bail shown in Fig. 5.

Fig. 7 is a view similar to Fig. 4 but illustrating a modification of the invention.

Fig. 8 is an elevational view of the bail to be used in connection with the form of the invention shown in Fig. 7.

Fig. 9 is an enlarged detailed view of a portion of the bail shown in Fig. 8.

Fig. 10 is a view similar to Fig. 4 but illustrating a further modification of the invention.

Fig. 11 is an elevational view of the bail to be used in connection with the form of the invention shown in Fig. 10.

Fig. 12 is an enlarged detailed view of a portion of the bail shown in Fig. 11.

Fig. 13 is another view similar to Fig. 4, but illustrating a further modification of the invention.

Fig. 14 is an elevational view of the bail to be used in connection with the form of the invention shown in Fig. 13.

Fig. 15 is an enlarged detailed view of a portion of the bail shown in Fig. 14.

Fig. 16 is another view similar to Fig. 4, but illustrating a further modification of the invention.

Fig. 17 is an elevational view of the bail to be used in connection with the form of the invention shown in Fig. 16.

Fig. 18 is an enlarged detailed view of a portion of the bail shown in Fig. 17.

Fig. 19 is another view similar to Fig. 4, but illustrating a further modification of the invention.

Fig. 20 is an elevational view of the bail to be used in connection with the form of the invention shown in Fig. 19.

Fig. 21 is an enlarged detailed view of a portion of the bail shown in Fig. 20.

Fig. 22 is another view similar to Fig. 4, but illustrating a further modification of the invention.

Fig. 23 is an elevational view of the bail to be used in connection with the form of the invention shown in Fig. 22.

Fig. 24 is an enlarged detailed view of a portion of the bail shown in Fig. 23.

Fig. 25 is another view similar to Fig. 4, but illustrating a further modification of the invention.

Fig. 26 is an elevational view of the bail to be used in connection with the form of the invention shown in Fig. 25.

Fig. 27 is an enlarged detailed view of a portion of the bail shown in Fig. 26.

Fig. 28 is another view similar to Fig. 4, but illustrating a further modification of the invention.

Fig. 29 is an elevational view of the bail to be used in connection with the form of the invention shown in Fig. 28.

Fig. 30 is an enlarged detailed view of a portion of the bail shown in Fig. 29.

Fig. 31 is another view similar to Fig. 4, but illustrating a further modification of the invention.

Fig. 32 is an elevational view of the bail to be used in connection with the form of the invention shown in Fig. 31.

Fig. 33 is an enlarged detailed view of a portion of the bail shown in Fig. 32.

Fig. 34 is a fragmentary sectional view similar to Fig. 2 but illustrating another modification of the invention.

Fig. 35 is a sectional view taken on the line 35—35 of Fig. 34.

The means for attaching a bail to a can, according to this invention, comprises a disc element 10 with a key opening 11. This disc element 10 continues into a flange portion 10$^a$ which is soldered, welded, or in any other manner attached on the side of a can 12. A bail 13 has arms 13′, each one of which is engageable with the disc element 10 of attaching means arranged on diametrically opposite sides of the can 12. Each bail arm 13′ has a key portion 13$^a$ cooperative with the key opening 11 for engaging these parts in a manner to be releasable only when the bail arm is in a predetermined position or positions.

The opening 11 has an offset branch portion 11$^a$ through which the key portion 13$^a$ may pass when the bail 13 is in a certain turned position. It is thus possible to connect together or disconnect the bail from the disc element. Each arm 13′ has an outwardly bent section 13$^b$ the end of which extends inwards a sufficient distance so that the key portion 13$^a$ may pass through the key opening 11$^a$. The flange 10$^a$ which is connected with the element 10 is sufficiently hollowed out so that the key portion 13$^a$ may be disposed therein. The offset portion 13$^b$ is capable of extending partially around the flange 10$^a$ so as not to interfere with the flange.

In Fig. 4 the important parts of the form of the invention shown in Figs. 1 to 3 is illustrated. The disc element portion is indicated by the reference numeral 10. It is provided with the key opening 11 having the offset branch portion 11$^a$. The bail 13 is illustrated with the bail arms 13′ having their end portions 13$^b$ terminating in the key elements 13$^a$. It is believed that this description is sufficient for the various parts to be recognized. The bail 13 is drawn on a reduced scale, while one of the arms 13′ is drawn on an enlarged scale.

In Fig. 5 a modification of the invention is shown in which there is a disc element 10$^c$ formed with a substantially cross-shaped key opening 11$^c$. The bail 13$^c$ has end portions 13$^{cc}$ each terminating in a spherical head 13$^d$ which may be forced through the center of the crossed key opening 13$^c$ to engage the bail upon the disc element.

In Fig. 6 another modification is shown in which there is a disc element 10$^e$ having a key opening 11$^e$ which is cooperative with a bail 13$^e$ having an arm 13$^{ee}$ with an offset hook portion 13$^f$ upon one side. The end of the arm may be forced through the opening 13$^e$ so that the hook portion 13$^f$ is forced in back of the disc element 10 for connecting the bail arm and the disc element together.

In Fig. 7 a disc element 10$^g$ is illustrated with a key opening 11$^g$ cooperative with a bail 13$^g$ having a spear pointed arm 13$^{gg}$ adapted to be forced through the opening 11$^g$ for connecting these parts together.

In Fig. 8 another form is shown in which the disc element 10$^h$ has no preformed key opening, but instead the bail 13$^h$ has a pointed arm 13$^{hh}$ adapted to pierce the disc element 10$^h$ to engage the bail upon the disc element.

In Fig. 9 a disc element 10$^i$ is illustrated with a key opening 11$^i$. A bail 13$^i$ is shown with arms, each one of which has a transverse end portion 13$^{ii}$. In one position the end portion 13$^{ii}$ may engage through the key opening 11$^i$.

In Fig. 10 a disc element 10$^j$ is illustrated with a key opening 11$^j$ and a bail 13$^j$. Each arm of the bail is formed with an eye opening 13$^{jj}$ to give the material on the sides of the point some resiliency. This material is bowed outwards. The arrangement is such that the end of the bail may be forced through the key opening 11$^j$ and maintain its position.

In Fig. 11 a disc element 10$^k$ is illustrated with a key opening 11$^k$ cooperative with the ends of the arms of a bail 13$^k$. Each arm has a semispherical head 13$^{kk}$ which may be forced through the key opening 11$^k$.

In Fig. 12 a disc element 10$^m$ is illustrated with a key opening 11$^m$ which is cooperative with the arms of a bail 13$^m$. Each arm has an offset curved portion 13$^{mm}$ which may be forced through the key opening 11$^{mm}$.

In Fig. 13 a disc element 10$^n$ is illustrated with a key opening 11$^n$ which is cooperative with the arms of a bail 13$^n$. Each arm has a double spear head 13$^{nn}$ engageable through the key opening 11$^n$.

In Figs. 14 and 15 there is a disc element 16$^p$ formed with peripheral perforations 14 engageable with complementary serrations 15$^a$ on an annular member 15 which is supported by an annular shaped cup 16 fixedly mounted upon the side wall of the tin can 12′. The annular cup 16 may be soldered, welded, or brazed fixedly in position.

Several resilient elements or springs 18 are attached on the inner face of the disc 16$^p$ and cooperate with the side wall of the can 12′ to urge the disc 16$^p$ outwards against a flange portion 16$^a$ of the annular cap 16. The serrations or teeth 14 engage the serrations or teeth 15$^a$ to hold the disc element 16$^p$ fixedly. When desired this element 16$^p$ may be forced inwards against the action of the springs 18 and the disc element 16$^p$ may be turned to positions in which the key opening 11$^p$ thereof is in different rotative positions.

There are several stamped out prongs 20 from the material of the disc 16$^p$ by which it may be gripped and readily turned. When the can 12 has diametrically holding means of this type it is possible to turn the disc element 16$^p$ of each of these two positions in which it is impossible to remove the bail or to positions in which the bail may be extended to a certain rotative position and then removed.

The bail arm 13′ has a key portion 13$^a$ which may be engaged into and removed from the key opening 11$^n$ in a position in which the key and the key opening are aligned. Once the bail is engaged in place and turned the key 13$^a$ will move out of alignment with the key opening and then the bail arm is not removable. The key opening 11$^p$ comprises a circular portion and a radial branch portion 11$^a$.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Means for attaching a bail to a can, comprising an annular cap secured on said can, an annular member within said annular cap, a disc element within the annular cap and having peripheral serrations or teeth engageable with complementary serrations or teeth on the annular member, and resilient means for urging the disc element into a position in which said teeth engage, said disc element being formed with a key opening cooperative with a bail arm having a key engageable through said key opening.

2. Means for attaching bails to a can, comprising an annular cap secured onto the side of said can, a disc element with a key opening within said annular cap, a bail arm having a key engageable into said opening, and means for holding said disc element in various rotative positions within said annular cap, comprising peripheral serrations or teeth on said disc element, engageable with complementary serrations or teeth on said annular cap, for holding said disc element in fixed positions, and resilient means for urging said disc element into a position in which said teeth will engage, whereby said disc element may be urged inwards by pressing on said bail arm to disengage said teeth to permit said disc element to be manually rotated to a new position and then releasing said bail arm to reengage said teeth to fixedly hold said disc element in its new position.

3. Means for attaching bails to cans, comprising an annular cap secured onto the side of said can, a disc element having a key opening rotatively supported within said cap and slightly movable axially of the cap, a bail arm having a key engageable into said opening, and means for fixedly holding said disc element in one of its axially movable positions.

THOMAS J. GORMAN, Jr.